US007489629B2

(12) United States Patent
Ye et al.

(10) Patent No.: US 7,489,629 B2
(45) Date of Patent: Feb. 10, 2009

(54) METHODS AND MEDIA ACCESS CONTROLLER FOR BROADBAND WIRELESS COMMUNICATIONS WITH VARIABLE DATA UNIT SIZE AND DELAYED DATA UNIT CONSTRUCTION

(75) Inventors: Fengji Ye, Troy, NY (US); Sanjay Bakshi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 11/005,841

(22) Filed: Dec. 7, 2004

(65) Prior Publication Data

US 2006/0120392 A1 Jun. 8, 2006

(51) Int. Cl.
*H04Q 7/00* (2006.01)

(52) U.S. Cl. .................. 370/230; 370/329; 370/469; 370/474

(58) Field of Classification Search ........... None
See application file for complete search history.

(56) References Cited

U.S. PATENT DOCUMENTS

| 6,879,561 B1 * | 4/2005 | Zhang et al. ......... 370/235 |
| 2002/0089935 A1 * | 7/2002 | Chan et al. ........... 370/252 |
| 2004/0218630 A1 * | 11/2004 | An ....................... 370/470 |

FOREIGN PATENT DOCUMENTS

| EP | 0254047 A2 | 1/1988 |
| WO | WO-9963703 A2 | 12/1999 |
| WO | WO-2004/012381 A1 | 2/2004 |
| WO | WO-2006/063349 A2 | 6/2006 |

OTHER PUBLICATIONS

Lettieri et al, "Adaptive Frame Length Control for Improving Wireless Link Throughput, Range, and Energy Efficiency", Mar. 1998, IEEE, INFOCOM '98, pp. 564-571.*

Ramachandran et al, "Performance Evaluation of IEEE 802.16 for Braodband Wireless Access," Aug. 2002, OPNET Work 2002, pp. 1-5.*

Eklund et al, "IEEE Standard 802.16: A Technical Overview of the WirelessMan™ Air Interface for Broadband Wireless Access", IEEE Communications Magazine, Jun. 2002, pp. 98-107.*

(Continued)

*Primary Examiner*—Chau Nguyen
*Assistant Examiner*—Robert C Scheibel
(74) *Attorney, Agent, or Firm*—Schwegman, Lundberg & Woessner, P.A.; Gregory J. Gorrie

(57) ABSTRACT

A media access controller (MAC) of a broadband wireless communication device may vary the size of data unit payloads based on a physical layer burst size. In automatic retransmission request (ARQ) enabled service flows, the MAC may delay construction of data units from the data unit payloads until after entering an ARQ retransmission request window. In some embodiments, the MAC comprises per-flow schedulers to schedule service data units (SDUs) for each of a plurality of service flows, and per-service flow retransmission request handlers to reconstruct and retransmit data units.

41 Claims, 3 Drawing Sheets

OTHER PUBLICATIONS

Lu et al, "Packet Loss in Mobile Ad Hoc Networks", Technical Report, Purdue University, Report CSD-TR 03-009, Apr. 2003, pp. 1-8.*

Akyildiz et al, "A New ARQ Protocol for Wireless ATM Networks", Jun. 1998, 1998 IEEE International Conference on Communications, vol. 2, pp. 1109-1113.*

"U.S. Appl. No. 11/005,801 Response filed Aug. 31,2007 to Non-Final Office Action mailed Jul. 17, 2007", 18 pgs.

"U.S. Appl. No. 11/005,801, Final Office Action Mailed Nov. 27, 2007", 15.

* cited by examiner

METHODS AND MEDIA ACCESS CONTROLLER FOR BROADBAND WIRELESS COMMUNICATIONS WITH VARIABLE DATA UNIT SIZE AND DELAYED DATA UNIT CONSTRUCTION

RELATED APPLICATIONS

This patent application is related to U.S. patent application Ser. No. 11/005,801, entitled "MEDIA ACCESS CONTROLLER WITH ENHANCED DATA UNIT RETRANSMISSION FOR BROADBAND WIRELESS COMMUNICATION AND METHOD" and filed Jun. 6, 2005, now abandoned.

TECHNICAL FIELD

Embodiments of the present invention pertain to broadband wireless communications. Some embodiments of the present invention relate to media access control.

BACKGROUND

In some wireless communication systems, such as broadband and WiMax-type communication systems, data may be transmitted to receiving stations in bursts. Due to the volatile nature of the communication channel, the burst size of the physical layer frames may have to be changed frequently to help ensure successful transmissions. As a result, a media access controller of a conventional transmitting station may have to reconstruct previously constructed data units to fit into either smaller or larger burst size frames. This reconstruction is very time sensitive and any delay may result in a lost transmission opportunity leading to in-efficient spectrum usage.

SUMMARY

Some embodiments are directed to a media access controller that includes a per-flow scheduler, a data unit constructor, and a physical layer. The per-flow scheduler generates a data unit payload from one or more service data units of an associated service flow of two or more service flows. The data unit constructor constructs an initial data unit from the data unit payload after the data unit payload enters a retransmission request window. The physical layer initially sets a physical-layer burst size based on channel conditions and to change the physical-layer burst size in response to changing channel conditions. The per-flow scheduler reduces a size of the data unit payload when the physical layer changes the physical-layer burst size at a rate greater than a nominal rate, and increases the size of the data unit payload when the physical layer changes the physical-layer burst size at a rate less than the nominal rate.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
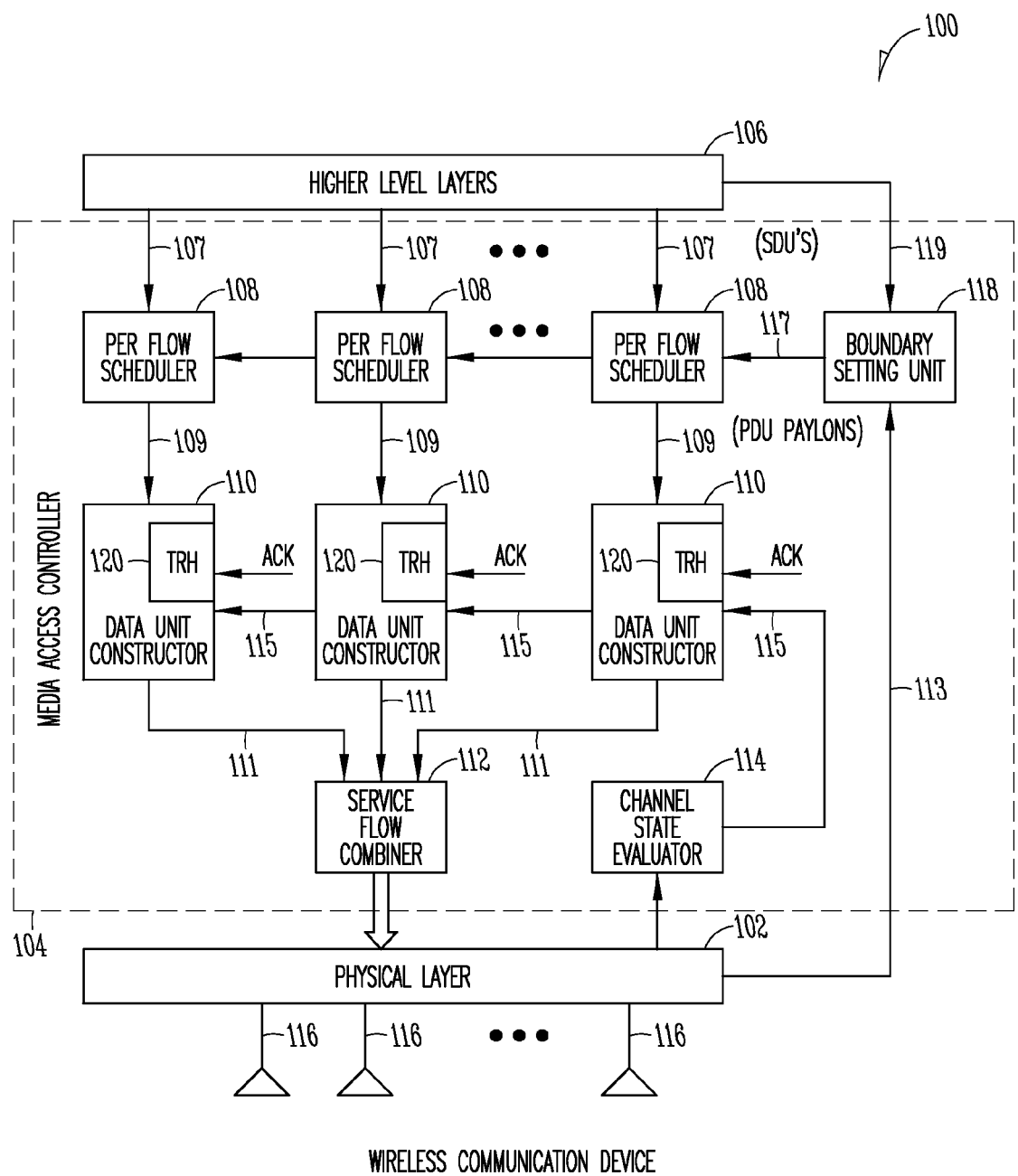
FIG. 1 is a block diagram of a wireless communication device in accordance with some embodiments of the present invention.

FIG. 1 is a block diagram of a wireless communication device in accordance with some embodiments of the present invention. Wireless communication device 100 may comprise a plurality of layers of a protocol stack including physical layer 102, media access controller (MAC) 104, and one or more of higher-level layers 106. In some embodiments, wireless communication device 100 may transmit and/or receive multicarrier communication signals with one or more other wireless communication devices using one or more of antennas 116. Multicarrier communication signals may include orthogonal frequency division multiplexed (OFDM) signals as well as orthogonal frequency division multiple access (OFDMA) signals. In some OFDMA embodiments, wireless communication device 100 may be a broadband or WiMax-type base station, although the scope of the invention is not limited in this respect.

In some embodiments, wireless communication device 100 may transmit physical-layer bursts comprising protocol data units (PDUs) of one or more service flows to one or more receiving stations. Examples of different service flows include voice, data, multimedia, streamed video, and Internet communications, although the scope of the invention is not limited in this respect.

In accordance with some embodiments of the present invention, media access controller 104 may vary the size of PDUs based on the physical layer burst size, although the scope of the invention is not limited in this respect. Media access controller 104 may also delay construction of PDUs from the PDU payloads until after the PDU payload enters an Automatic Retransmission reQuest (ARQ) retransmission request window, although the scope of the invention is not limited in this respect. In some embodiments, the retransmission window may be an automatic repeat request window and may be part of an automatic repeat request process, although the scope of the invention is not limited in this respect. These embodiments are discussed in more detail below.

In some embodiments, media access controller 104 may comprise one or more of per-flow schedulers 108 associated with each of a plurality of service flows. Per-flow schedulers 108 receive service data units (SDUs) 107 for their associated service flow from higher-level layers 106 and may, among other things, generate data unit payloads 109. Media access controller 104 may also comprise data unit constructors 110 to construct data units from data unit payloads 109.

In some embodiments, per-flow schedulers 108 may vary a size of data unit payloads based on available physical layer burst size and bandwidth allocations for the flow. For ARQ enabled flows, data unit constructors 110 may construct per-flow data units from the data unit payloads of varied size after entering a retransmission request window. In these embodiments, data unit constructors 110 may delay construction of per-flow data units from the data unit payloads until after entering the ARQ retransmission request window. In these embodiments, the boundaries of the per-flow data unit payloads may be determined from the physical layer burst size history. In some embodiments, the per flow schedulers schedules traffic based on the characteristics of the service flows (e.g. delay, jitter and bandwidth) by interacting with boundary setting unit, although the scope of the invention is not limited in this respect. In some embodiments, a size of the data unit payload generated by per-flow schedulers 108 may be based on real-time feedback from physical layer 102 indicating a physical-layer burst size, although the scope of the invention is not limited in this respect.

In some embodiments, per-flow schedulers 108 may perform fragmentation and packing on received service data units of an associated service flow to generate the data unit payloads for the associated service flow. In some embodiments, data unit constructors 110 may also be associated with one of the service flows. Data unit constructors 110 may construct per-flow data units 111 from data unit payloads 109 after the data unit payloads enter a retransmission request window for an associated one of the service flows. In these embodiments, the data unit payloads may be provided by an associated one of per-flow schedulers 108 and may comprise fragmented and packed portions of one or more service data units of the associated service flow.

In some embodiments, data unit constructors 110 may refrain from delaying construction of per-flow data units for service flows that do not have ARQ retransmission requests enabled. In these embodiments, there may be less reason to delay construction of per-flow data units because the per-flow data units are not retransmitted.

In some embodiments, per-flow schedulers 108 may change the size of data unit payloads when a physical layer burst size changes frequently. In these embodiments, per-flow schedulers 108 may increase the size of the data unit payload when the physical layer burst size changes less frequently. When the physical layer burst size changes frequently, the channel may be less stable and smaller MAC PDUs have a greater chance of successful transmission, although the scope of the invention is not limited in this respect. When the physical layer burst size changes less frequently, the channel may be closer to the channel's equilibrium state and the burst size may be restored to a more optimum size determined by boundary setting unit 118. In this way, the data unit payload size may reflect the influence of the variation in the channel in a timely fashion. This may also reduce the demand to resize the per-flow data unit frequently. The delayed data unit constriction may further alleviate the burden of adjusting a data unit by allowing it to reuse the existing service data unit fragments. In some embodiments, per-flow schedulers 108 may receive boundary information 117 from boundary setting unit 118 for use in setting the size of data unit payloads.

In some embodiments, data unit constructors 110 may include retransmission request handlers (TRHs) 120 associated with each of the service flows to, among other things, construct per-flow data units 111 from data unit payloads 109. In some embodiments, retransmission request handlers 120 may reconstruct at least portions or fragments of per-flow data units for retransmission when the portions or fragments are not successfully received by a receiving station. In these embodiments, retransmission request handlers 120 may maintain ARQ retransmission request window for their associated service flow. The ARQ retransmission request window may comprise a sliding buffer to reference previously transmitted data units for a particular service flow for which ARQ retransmission requests are enabled. This buffer may be advanced either after one of the transmitted data units is acknowledged as being received or after a predetermined period of time. For ARQ enabled service flows, a data unit payload enters the ARQ retransmission request window after the buffer advances.

In some embodiments, media access controller 104 may also comprise service flow combiner 112 to combine data units 111 from the different service flows for transmission in a single physical-layer burst by physical layer 102. The operations of media access controller 104 are described in more detail below.

In some embodiments, the size of the data unit payload generated by one of per-flow schedulers 108 may be based at least in part, on physical-layer burst size 113. Boundary setting unit 118 may set boundaries for the size of the data unit payload generated by any one of per-flow scheduler 108 based at least in part on physical-layer burst size 113. In some embodiments, boundary setting unit 118 may instruct the scheduler to reduce the size of data unit payloads after a physical layer burst size changes frequently. Boundary setting unit 118 may instruct any one of per-flow schedulers 108 to reduce the size of data unit payloads after channel conditions degrade. In these embodiments, boundary setting unit 118 may gradually restore the size of the data unit payloads after the physical layer burst size changes less frequently. Physical-layer burst size 113 may be provided by physical layer 102, although the scope of the invention is not limited in this respect.

In some embodiments, boundary setting unit 118 may set the size of the data unit payload for a particular service flow based, at least in part, on an allocated bandwidth, delay and/or jitter for the service flow associated with the data unit payload. Higher-level layers 106 may provide information 119 for each service flow associated with the per flow schedulers 108. Information 119 may include bandwidth, delay and/or jitter for the service flow. In some embodiments, boundary setting unit 118 may calculate an optimal data unit payload size based on a bandwidth allocation scheme for a particular service flow and may adjust the data unit payload size on the fly based on channel conditions and other information provided by physical layer 102, MAC layer 104 and/or higher-level layers 106, although the scope of the invention is not limited in this respect.

Although wireless communication device 100 is illustrated as having several separate functional elements, one or more of the functional elements may be combined and may be implemented by combinations of software-configured elements, such as processing elements including digital signal processors (DSPs), and/or other hardware elements. For example, media access controller 104 may comprise one or more processing elements such as one or more microprocessors, DSPs, application specific integrated circuits (ASICs), and combinations of various hardware and logic circuitry for performing at least the functions described herein. In some embodiments, the functional elements of wireless communication device 100 may refer to one or more processes operating on one or more processing elements.

In some embodiments, physical layer 102 may transmit orthogonal frequency division multiplexed (OFDM) signals comprising a plurality of orthogonal subcarriers. In some embodiments, the orthogonal subcarriers may be closely spaced OFDM subcarriers. To achieve orthogonality between closely spaced subcarriers, in some embodiments, the subcarriers may have nulls at substantially the center frequencies of the other subcarriers. In some embodiments, wireless communication device 100 may communicate with one or more other communication stations over an orthogonal frequency division multiple access (OFDMA) communication channel. In some embodiments, wireless communication device 100 may be a multiple-input multiple-output (MIMO) communication device and may use two or more of antennas 116 to transmit multiple data streams, although the scope of the invention is not limited in this respect. Antennas 116 may comprise one or more directional or omnidirectional antennas, including, for example, dipole antennas, monopole antennas, patch antennas, loop antennas, microstrip antennas or other types of antennas suitable for reception and/or transmission of multicarrier radio-frequency signals.

In some embodiments, wireless communication device 100 may be a base station, a subscriber station, personal digital assistant (PDA), a laptop or portable computer with wireless communication capability or other device that may receive and/or transmit information wirelessly. In some embodiments, wireless communication device 100 may transmit and/or receive RF communications in accordance with specific communication standards, such as the Institute of Electrical and Electronics Engineers (IEEE) standards including IEEE 802.16 standards for wireless metropolitan area networks (WMANs), although wireless communication device 100 may also be suitable to transmit and/or receive communications in accordance with other techniques.

As can be seen, delayed or late MAC PDU construction may improve the efficiency of media access controller 104 by providing a "last-instant" opportunity to resize a MAC PDU to reflect the latest physical channel conditions. Little or no implications to other functions of media access control may be incurred. In some embodiments, the late construction of PDUs may allow data unit constructors 110 to be reused as part of an ARQ retransmission request process. With late PDU construction, a broadband or WiMax media access controller may better accommodate rapid changes of physical layer burst sizes which may improve the robustness of the media access control operations and may lead to greater spectrum utilization and efficiency.

In some embodiments, media access controller 104 may comprise a media access controller common part sublayer (CPS) of a media access control layer, although the scope of the invention is not limited in this respect. In these embodiments, media access controller 104 may build a data unit that may be delayed in the data flow and finalized almost immediately before data unit concatenation by service flow combiner 112. In some embodiments, media access controller 104 may schedule a data unit payload of a service flow in a queue dedicated for the associated service flow according to quality of service (QoS) requirements for the service flow, although the scope of the invention is not limited in this respect. The boundaries of the data unit payload may be decided by boundary setting unit 118.

In some embodiments, the operations performed by media access controller 104 after fragmentation and packing may depend on an ARQ retransmission request feature. If the ARQ retransmission request feature is not enabled, the data unit may be finalized by building the header and/or subheaders and execution of payload encryption before the data unit is fitted into a physical layer burst. When an ARQ retransmission request feature is enabled, the data unit is not finalized immediately. Instead, data unit constructors 110 may wait to enter the ARQ retransmission request window (i.e., in terms of ARQ blocks) and then one of data unit constructors 110 may perform data unit construction from the packed service data unit fragments. An ARQ block may be smallest granularity of data units in an ARQ retransmission request window.

The finalized per-flow data unit may be concatenated with ongoing per-flow data units in other service flows by service flow combiner 112 and may be fitted into a physical layer burst for transmission by physical layer 102. In some embodiments, when a corresponding acknowledgement is received before the timeout, the ARQ retransmission request window may advance if applicable and any new data unit that enters the window may get constructed and finalized; otherwise an ARQ retransmission request may be initiated.

In some embodiments, delayed or late data unit construction may postpone at least some tasks for data unit construction until the last possible stage. Examples of such as the tasks may include determining the boundaries and payload encryption. Some embodiments of the present invention may help prevent a finalized data unit from waiting in a queue reducing the risk of unnecessary reconstruction. In some embodiments, a last-instant opportunity for ARQ retransmission request management may be provided to allow a data unit to be resized to reflect the latest change in the channel condition. In some embodiments, late per flow data unit construction may reuse the same modules (e.g., data unit constructors 110) that are used when an ARQ retransmission request calls for a data unit rearrangement, resulting in changing the size of a data unit by repacking the original service data unit fragments. In many situations, data unit rearrangement may be called by channel state evaluator 114 and may result from a deteriorating channel condition. In such a rearrangement, the per flow data unit size may be reduced; however the late data unit construction may prevent a fragmentation and packing algorithm from being re-invoked when the original fragments remain intact. In some embodiments, channel state evaluator may provide a channel state signal 115 for a particular service flow to each transmission request handler 120 indicating whether rearrangement is to be performed, although the scope of the invention is not limited in this respect.

Figure 2:
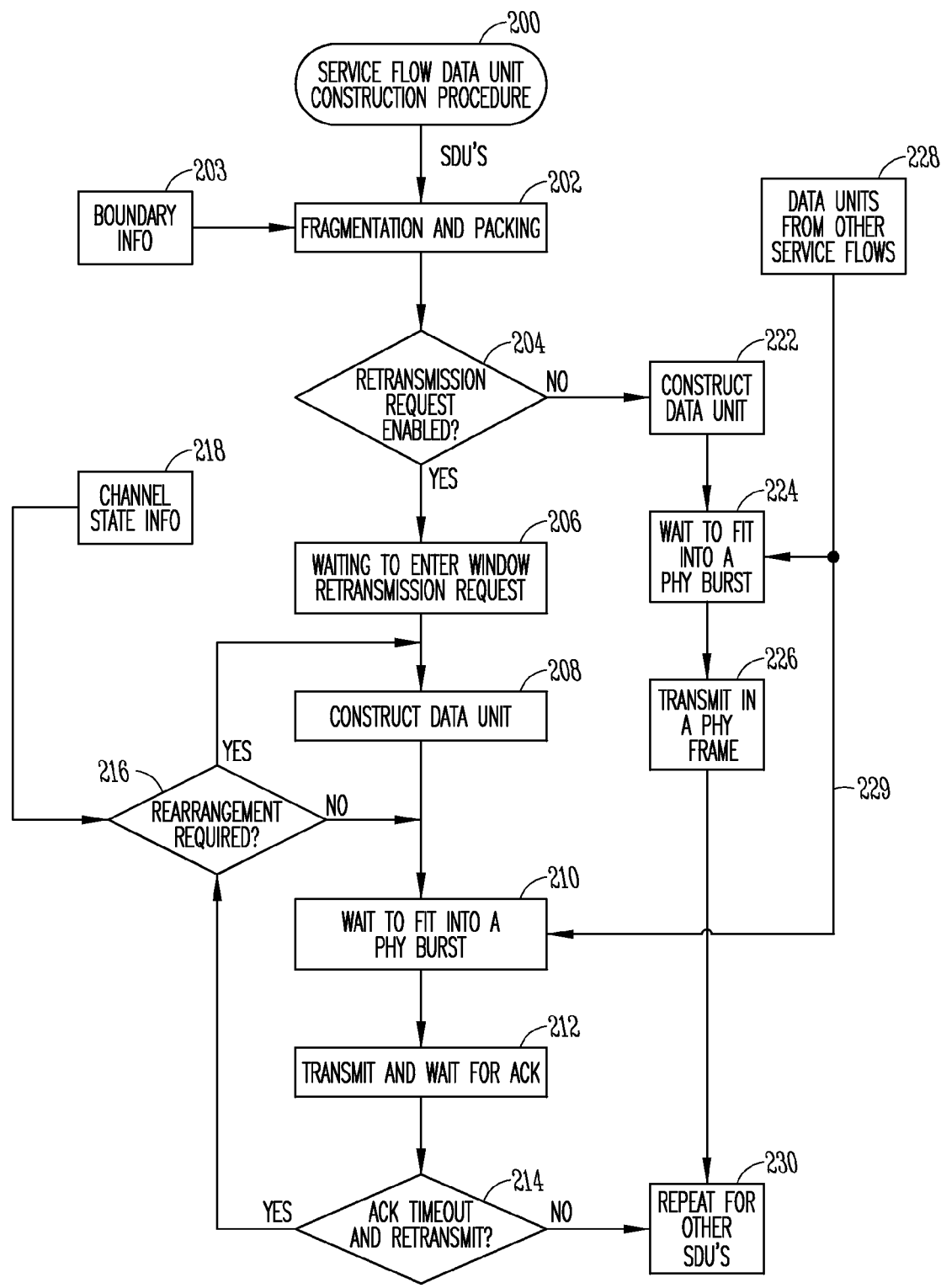
FIG. 2 is a flow chart of a service flow data unit construction procedure in accordance with some embodiments of the present invention.

FIG. 2 is a flow chart of a service flow data unit construction procedure in accordance with some embodiments of the present invention. Service flow data unit construction procedure 200 may be performed by media access controller 104 (FIG. 1), although other media access controller configurations may also be used. In operation 202, one or more service data units for a particular service flow are received from higher-level layers of the protocol stack. In operation 202, the one or more service data units may be fragmented, and the fragments may be packed into data unit payloads. In some embodiments, the data unit payloads may be referred to as protocol data unit (PDU) payloads and may be MAC PDUs, although the scope of the invention is not limited in this respect. The data unit payloads may include fragments from more than one service data unit and the size of the data unit payload may be set based on boundary information 203. In some embodiments, boundary information 203 may correspond to boundary information 117 (FIG. 1) and may be based on a bandwidth allocation for the associated service flow and/or a physical layer burst size allowing the size of the data unit payloads to be varied. Operation 202 may be performed by per-flow schedulers 108 (FIG. 1), although the scope of the invention is not limited in this respect.

Operation 204 determines if ARQ retransmission requests are enabled. When ARQ retransmission requests are enabled, operation 206 may be performed, and when ARQ retransmission requests are not enabled, operation 222 may be performed.

Operation 206 comprises waiting to enter a retransmission request window. In other words, operation 208 may be performed after pointers in the buffer advance after receipt of an acknowledgement for a successfully received data unit. In some embodiments, operation 206 delays construction of a per-flow data unit to allow for retransmission of previously transmitted data units and/or resizing of the per-flow data units.

Operation 208 comprises constructing a per-flow data unit from the data unit payload generated in operation 202. Operation 208 may include adding headers, subheaders and/or encrypting the payload portion of the data unit to generate a complete data unit. In some embodiments, operation 208 may optionally comprise calculating and appending a cyclic redundancy check extension to a data unit. Operations 204, 206 and 208 may be performed by data unit constructors 110 (FIG. 1), although the scope of the invention is not limited in this respect.

Operation 210 comprises concatenating and/or combining the per-flow data unit generated in operation 208 with per-flow data units 229 for other service flows and waiting to fit the concatenated per-flow data units into a physical layer burst. The physical layer burst size may have been previously set based on channel conditions and optimized based on boundary setting unit 118. Operation 210 may be performed by service flow combiner 112 (FIG. 1), although the scope of the invention is not limited in this respect.

Operation 212 comprises transmitting the physical layer burst and waiting for an acknowledgement (ACK) from the receiving station. When an acknowledgement is received or received without a timeout, operation 230 may be performed. Operation 230 may indicate the successful transmission of per-flow data units allowing portions of procedure 200 to be performed in a pipeline fashion for subsequent service data units.

When an acknowledgement is not received within a predetermined period of time, or when a negative acknowledgement (NACK) received in operation 214 indicating an unsuccessful transmission of portions of a physical layer burst, operation 216 is performed.

Operation 216 determines whether rearrangement of the unsuccessfully transmitted data unit is required based on channel state information 218. Data unit rearrangement may be required when channel conditions degrade resulting in more ARQ retransmission requests, for example. When data unit rearrangement is not required, operations 210-214 are repeated in which the portions of the data unit that were not successfully received are concatenated into another physical layer burst and retransmitted. Operations 214 and 216 may be performed by retransmission request handlers 120 (FIG. 1), although the scope of the invention is not limited in this respect.

When operation 216 determines that rearrangement is required, operation 208 may be performed in which a new data unit is constructed to include the portions that were unsuccessfully transmitted. In some embodiments, the data unit constructed in operation 208 may be smaller that previously constructed, although the scope of the invention is not limited in this respect.

Operation 222 comprises constructing a data unit from the data unit generated in operation 202 when ARQ transmissions requests are not enabled. Operation 224 comprises concatenating the data unit with data units 229 of other service flows 228 and fitting the concatenated data units into a physical layer burst. Operation 226 comprises transmitting the data units of the physical layer burst (e.g., within a physical layer frame). Operation 222 may be performed by data unit constructor 110 (FIG. 1), operation 224 may be performed by service flow combiner 112 (FIG. 1) and operation 226 may be performed by physical layer 102 (FIG. 1), although the scope of the invention is not limited in this respect.

Although the individual operations of procedure 200 are illustrated and described as separate operations, one or more of the individual operations may be performed concurrently, and nothing requires that the operations be performed in the order illustrated. For example, service data units may be received from upper level layers, and one or more of operations 202-226 may be performed in a pipeline fashion as service data unit are received by a media access controller and scheduled.

Figure 3:
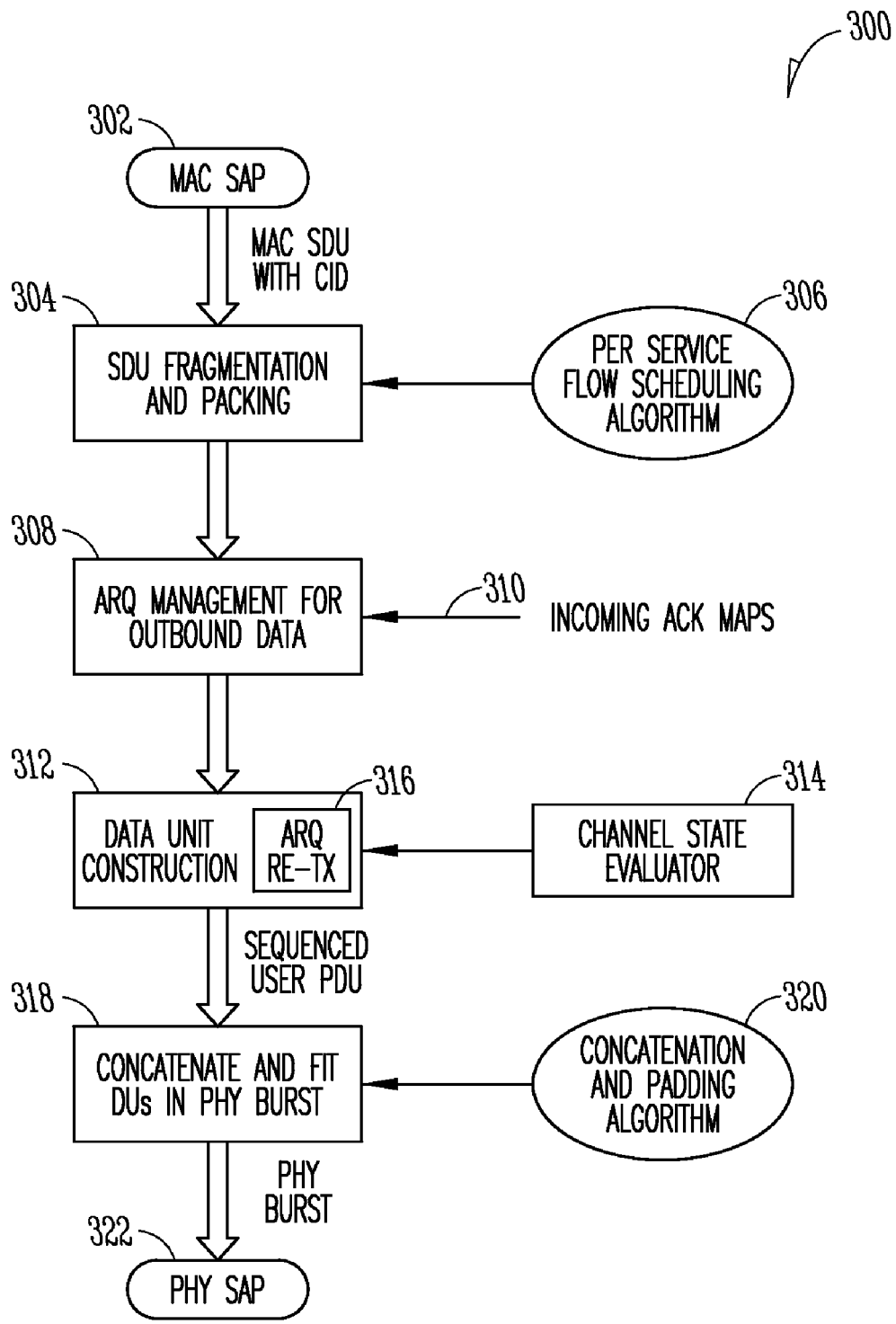
FIG. 3 illustrates the operations of a media access controller in accordance with some embodiments of the present invention.

FIG. 3 illustrates the operations of a media access controller in accordance with some embodiments of the present invention. Media access controller operations 300 may be performed by media access controller 104 (FIG. 1), although other media access controller configurations may also be suitable. Media access controller operations 300 illustrate operations of procedure 200 (FIG. 2) as performed by a media access controller such as media access controller 104 (FIG. 1). FIG. 3 illustrates service access point (SAP) 302 which may interface with one or more upper-level layers 106 (FIG. 1). Media access controller operations 300 may include service data unit fragmentation and packing operations 304 which may be performed by per-flow schedulers 108 (FIG. 1) based on per-service flow scheduling algorithm 306. Media access controller operations 300 may also include ARQ retransmission request management operations 308 for the outbound data, which may be responsive to incoming acknowledgement (ACK) maps 310.

Media access controller operations 300 may also include data unit construction operations 312, which may include operations 316 for ARQ retransmission requests. Operations 312 and 316 may be response to channel state conditions provided by channel state evaluator 314, which may correspond to channel state evaluator 114 (FIG. 1).

Media access controller operations 300 may also include concatenation operations 318 for fitting data units into the variable size physical layer bursts based on concatenation and padding algorithm 320. FIG. 3 also illustrates physical layer service access point (SAP) 322 which may receive the concatenated data units for a physical layer burst.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A media access controller comprising:
a per-flow scheduler to generate a data unit payload from one or more service data units of an associated service flow of two or more service flows;
a data unit constructor to construct an initial data unit from the data unit payload after the data unit payload enters a retransmission request window;
a physical layer to initially set a physical-layer burst size based on channel conditions and to change the physical-layer burst size in response to changing channel conditions,
wherein the per-flow scheduler reduces a size of the data unit payload when the physical layer changes the physical-layer burst size at a rate greater than a nominal rate, and
wherein the per-flow scheduler increases the size of the data unit payload when the physical layer changes the physical-layer burst size at a rate less than the nominal rate,
wherein the data unit constructor is adapted to delay construction of data units for service flows having automatic retransmission requests enabled, and
wherein the data unit constructor is further adapted to refrain from delaying construction of data units for service flows that do not have the automatic retransmission requests enabled.

2. The media access controller of claim 1 wherein the size of the data unit payload generated by the per-flow scheduler is based at least in part, on real-time feedback from the physical layer indicating the physical-layer burst size.

3. The media access controller of claim 2 further comprising a boundary setting unit to set the size of the data unit payload generated by the per-flow scheduler based at least in part on the physical-layer burst size, wherein the boundary setting unit is adapted to instruct the scheduler to reduce the size of data unit payloads after the physical-layer burst size changes at a rate greater than the nominal rate, and
wherein the boundary setting unit is adapted to restore the size of the data unit payloads after the physical-layer burst size changes at a rate less than the nominal rate.

4. The media access controller of claim 3 wherein the boundary setting unit is adapted to instruct the scheduler to reduce the size of data unit payloads after channel conditions degrade, and
wherein the boundary setting unit is adapted to instruct the scheduler to increase the size of the data unit payloads after channel conditions improve.

5. The media access controller of claim 2 further comprising a boundary setting unit to set the size of the data unit payload based, at least in part, on an allocated bandwidth for the associated service flow of the data unit payload.

6. The media access controller of claim 2 wherein the retransmission request window comprises a buffer to reference previously transmitted data units, the buffer to advance either after one of the transmitted data units is acknowledged as being received or after a predetermined period of time,
wherein the data unit payload enters the retransmission request window after the buffer advances.

7. The media access controller of claim 2 wherein the data unit constructor comprises a retransmission request handler to reconstruct data units from the data unit payloads for subsequent retransmission within physical-layer bursts,
wherein the retransmission request handler reconstructs data units from portions of previously transmitted data units that are not acknowledged as being received.

8. The media access controller of claim 7 wherein the data units comprise a plurality of fragments of the service data units,
wherein the retransmission request handler is adapted to retransmit a fragment after a transmitted fragment is not acknowledged as being received,
wherein the retransmission request handler is further adapted to generate a new data unit by combining the fragment for retransmission with fragments of other service data units received by the per-flow scheduler for transmission in a subsequent physical-layer burst.

9. The media access controller of claim 8 wherein the at least one retransmission request handler is adapted to reconstruct a data unit based on channel conditions for subsequent retransmissions after the transmitted fragment is not acknowledged as being received,
wherein the retransmission request handler is adapted to reconstruct the data units by adding a header to data unit payloads of reduced size after channel conditions degrade.

10. The media access controller of claim 1 wherein the per-flow scheduler is one of a plurality of per-flow schedulers adapted to fragment and pack service data units of an associated service flow to generate the data unit payloads for the associated service flow.

11. The media access controller of claim 10 wherein the data unit constructor is one of a plurality of data unit constructors, each data unit constructor being associated with one of the service flows, and
wherein the data unit constructors are adapted to construct data units from the data unit payloads after one of the data unit payloads enters a retransmission request window for an associated one of the service flows.

12. The media access controller of claim 11 wherein the data unit constructors comprise a retransmission request handler, and
wherein each of the retransmission request handlers is adapted to maintain a retransmission request window for an associated one of the service flows to perform retransmissions for at least portions of data units of the associated service flow that are not acknowledged as being received during the associated retransmission request window.

13. The media access controller of claim 10 wherein the service flows comprise one or more of a voice, data, multimedia, streaming video and internet communication.

14. The media access controller of claim 10 further comprising a service flow combiner adapted to combine data units from more than one service flow provided by the data unit constructors for subsequent transmission with a single physical-layer burst.

15. The media access controller of claim 14 wherein the media access controller is one layer of a protocol stack,
wherein the per-flow schedulers are adapted to receive service data units for an associated one of the service flows from a higher-level layer of the protocol stack, and wherein the service flow combiner is adapted to provide the combined data units to the physical layer of the protocol stack for transmission to one or more receiving stations.

16. The media access controller of claim 15 wherein the physical layer comprises a multicarrier transmitter adapted to transmit orthogonal frequency division multiple access communication signals comprising a plurality of orthogonal subcarriers.

17. A method for operating a media access controller comprising:
generating a data unit payload from one or more service data units of an associated service flow of two or more service flows;
constructing an initial data unit from the data unit payload after the data unit payload enters a retransmission request window;
initially setting a physical-layer burst size based on channel conditions and changing the physical-layer burst size in response to changing channel conditions
reducing a size of the data unit payload after the physical-layer burst size changes at a rate greater than a nominal rate; and
increasing the size of the data unit payload when the physical-layer burst size changes at a rate less than the nominal rate,
delaying construction of data units for service flows having automatic retransmission requests enabled; and
refraining from delaying construction of data units for service flows that do not have the automatic retransmission requests enabled.

18. The method of claim 17 wherein the size of the data unit payload generated by the per-flow scheduler is based at least in part, on real-time feedback indicating the physical-layer burst size.

19. The method of claim 18 further comprising setting the size of the data unit payload based at least in part on the physical-layer burst size, wherein setting comprises:
reducing the size of data unit payloads after the physical-layer burst size changes at a rate greater than the nominal rate, and
restoring the size of the data unit payloads after the physical-layer burst size changes at a rate less than the nominal rate.

20. The method of claim 19 wherein setting comprises:
reducing the size of data unit payloads after channel conditions degrade; and
increasing the size of data unit payloads after channel conditions improve.

21. The method of claim 18 further comprising setting the size of the data unit payload based, at least in part, on an allocated bandwidth for the associated service flow of the data unit payload.

22. The method of claim 18 wherein the retransmission request window comprises a buffer to reference previously transmitted data units, the method further comprising advancing the buffer either after one of the transmitted data units is acknowledged as being received or after a predetermined period of time,
wherein the data unit payload enters the retransmission request window after the buffer advances.

23. The method of claim 18 further comprising reconstructing data units from the data unit payloads for subsequent retransmission within physical-layer bursts, the data units being reconstructed from portions of previously transmitted data units that are not acknowledged as being received.

24. The method of claim 23 wherein the data units comprise a plurality of fragments of the service data units, the method further comprising:
retransmitting a fragment after a transmitted fragment is not acknowledged as being received; and
generating a new data unit by combining the fragment for retransmission with fragments of other service data units for transmission in a subsequent physical-layer burst.

25. The method of claim 24 further comprising:
reconstructing a data unit based on channel conditions for subsequent retransmissions after the transmitted fragment is not acknowledged as being received; and
reconstructing the data units by adding a header to a data unit payload of reduced size after channel conditions degrade.

26. The method of claim 17 further comprising fragmenting and packing service data units of an associated service flow to generate the data unit payloads for the associated service flow.

27. The method of claim 26 further comprising constructing data units from the data unit payloads after one of the data unit payloads enters a retransmission request window for an associated one of the service flows.

28. The method of claim 27 further comprising maintaining a retransmission request window for an associated one of the service flows to perform retransmissions for at least portions of data units of the associated service flow that are not acknowledged as being received during the associated retransmission request window.

29. The method of claim 26 wherein the service flows comprise one or more of a voice, data, multimedia, streaming video and internet communication.

30. The method of claim 26 further comprising combining data units from more than one service flow for subsequent transmission with a single physical-layer burst.

31. The method of claim 30 further comprising:
receiving service data units for an associated one of the service flows from a higher-level layer of a protocol stack; and
providing the combined data units to a physical layer of the protocol stack for transmission to one or more receiving stations.

32. The method of claim 31 wherein the physical layer comprises a multicarrier transmitter, and
wherein the method comprises transmitting orthogonal frequency division multiple access communication signals comprising a plurality of orthogonal subcarriers.

33. A wireless communication device comprising:
a media access controller; and
a physical layer for transmitting data units of more than one service flow within a single physical layer burst,
wherein the physical layer initially sets a physical-layer burst size based on channel conditions and to change the physical layer burst size in response to changing channel conditions
wherein the media access controller comprises:
a per-flow scheduler to generate a data unit payload from one or more service data units of an associated service flow of two or more service flows; and
a data unit constructor to construct an initial data unit from the data unit payload after the data unit payload enters a retransmission request window,
wherein the per-flow scheduler reduces a size of the data unit payload when the physical layer changes the physical-layer burst size at a rate greater than a nominal rate, and wherein the per-flow scheduler increases the size of the data unit payload when the physical layer changes the physical-layer burst size at a rate less than the nominal rate, wherein the data unit constructor is adapted to delay construction of data units for service flows having automatic retransmission requests enabled, and wherein the data unit constructor is farther adapted to refrain from delaying construction of data units for service flows that do not have the automatic retransmission requests enabled.

34. The wireless communication device of claim 33 wherein the media access controller further comprises a boundary setting unit to set the size of the data unit payload generated by the per-flow scheduler based at least in part on the physical-layer burst size, wherein the boundary setting unit is adapted to instruct the scheduler to reduce the size of data unit payloads after the physical-layer burst size changes frequently, and wherein the boundary setting unit is adapted to restore the size of the data unit payloads after the physical-layer burst size changes at a rate less than the nominal rate.

35. The wireless communication device of claim 34 wherein the media access controller further comprises a boundary setting unit to set the size of the data unit payload based, at least in part, on an allocated bandwidth for the associated service flow of the data unit payload.

36. The wireless communication device of claim 33 wherein the data unit constructor comprises a retransmission request handler to reconstruct data units from the data unit payloads for subsequent retransmission within physical-layer bursts, wherein the retransmission request handler reconstructs data units from portions of previously transmitted data units that are not acknowledged as being received.

37. The wireless communication device of claim 33 wherein the physical layer comprises a multicarrier transmitter adapted to transmit orthogonal frequency division multiple access communication signals comprising a plurality of orthogonal subcarriers.

38. A computer-readable medium that stores instructions for execution by one or more processors to perform operations comprising:

generating a data unit payload from one or more service data units of an associated service flow of two or more service flows;

constructing an initial data unit from the data unit payload after the data unit payload enters a retransmission request window;

initially setting a physical-layer burst size based on channel conditions and changing the physical-layer burst size in response to changing channel conditions;

reducing a size of the data unit payload after the physical-layer burst size changes at a rate greater than a nominal rate; and increasing the size of the data unit payload when the physical-layer burst size changes at a rate less than the nominal rate, delaying construction of data units for service flows having automatic retransmission requests enabled; and refraining from delaying construction of data units for service flows that do not have the automatic retransmission requests enabled.

39. The computer-readable medium of claim 38 wherein the instructions, when further accessed cause the machine to perform operations further comprising setting the size of the data unit payload based, at least in part, on an allocated bandwidth for the associated service flow of the data unit payload.

40. The computer-readable medium of claim 38 wherein the instructions, when further accessed cause the machine to perform operations further comprising reconstructing data units from the data unit payloads for subsequent retransmission within physical-layer bursts, the data units being reconstructed from portions of previously transmitted data units that are not acknowledged as being received.

41. The computer-readable medium of claim 38 wherein the instructions, when further accessed cause the machine to perform operations comprising transmitting orthogonal frequency division multiple access communication signals comprising a plurality of orthogonal subcarriers.

* * * * *

UNITED STATES PATENT AND TRADEMARK OFFICE
CERTIFICATE OF CORRECTION

PATENT NO.      : 7,489,629 B2
APPLICATION NO. : 11/005841
DATED           : February 10, 2009
INVENTOR(S)     : Ye et al.

It is certified that error appears in the above-identified patent and that said Letters Patent is hereby corrected as shown below:

Column 13, line 9, in Claim 33, delete "farther" and insert -- further --, therefor.

Signed and Sealed this

Fourteenth Day of April, 2009

JOHN DOLL
*Acting Director of the United States Patent and Trademark Office*